United States Patent
Teshima et al.

(10) Patent No.: US 7,528,182 B2
(45) Date of Patent: May 5, 2009

(54) PROCESS FOR PRODUCING COLORANT DISPERSOID

(75) Inventors: Takayuki Teshima, Yokohama (JP); Ryuji Higashi, Kawasaki (JP); Koichi Sato, Atsugi (JP); Hitoshi Toma, Yokohama (JP); Ken Eguchi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 529 days.

(21) Appl. No.: 11/219,728

(22) Filed: Sep. 7, 2005

(65) Prior Publication Data

US 2006/0057485 A1 Mar. 16, 2006

(30) Foreign Application Priority Data

Sep. 10, 2004 (JP) .............................. 2004-264498

(51) Int. Cl.
*B01F 3/08* (2006.01)

(52) U.S. Cl. .................................................... 523/313

(58) Field of Classification Search .................. 523/313
See application file for complete search history.

(56) References Cited

U.S. PATENT DOCUMENTS

| | | | |
|---|---|---|---|
| 5,085,698 A | 2/1992 | Ma et al. | 106/20 |
| 7,004,579 B2 | 2/2006 | Sato et al. | 347/105 |
| 7,056,972 B2 | 6/2006 | Nakazawa et al. | 524/505 |
| 7,067,590 B2 | 6/2006 | Sato et al. | 525/299 |
| 2002/0040662 A1 | 4/2002 | Dietz et al. | 106/400 |
| 2005/0033010 A1 | 2/2005 | Sato et al. | 528/80 |
| 2005/0131102 A1 | 6/2005 | Nakazawa et al. | 523/160 |
| 2005/0140762 A1 | 6/2005 | Sato et al. | 347/100 |
| 2005/0197424 A1 | 9/2005 | Higashi et al. | 523/160 |
| 2005/0209367 A1 | 9/2005 | Sato et al. | 523/161 |
| 2005/0219277 A1 | 10/2005 | Sato et al. | 347/1 |
| 2005/0239918 A1 | 10/2005 | Nakazawa et al. | 523/160 |
| 2005/0249925 A1 | 11/2005 | Ikegami et al. | 428/195.1 |
| 2006/0004124 A1 | 1/2006 | Tsubaki et al. | 523/160 |
| 2006/0047015 A1 | 3/2006 | Duda et al. | 523/160 |
| 2006/0050117 A1 | 3/2006 | Sato et al. | 347/100 |
| 2006/0057485 A1 | 3/2006 | Teshima et al. | 430/108.8 |
| 2006/0100310 A1 | 5/2006 | Nakazawa et al. | 523/160 |
| 2006/0128828 A1 | 6/2006 | Sato et al. | 523/160 |
| 2006/0144287 A1 | 7/2006 | Tsubaki et al. | 106/31.13 |
| 2006/0146087 A1 | 7/2006 | Sato et al. | 347/21 |
| 2006/0148997 A1 | 7/2006 | Sato et al. | 525/299 |
| 2006/0160975 A1 | 7/2006 | Suda et al. | 526/330 |
| 2006/0178468 A1 | 8/2006 | Sato et al. | 524/556 |
| 2006/0221117 A1 | 10/2006 | Sato et al. | 347/21 |
| 2006/0235177 A1 | 10/2006 | Ikegami et al. | 526/287 |
| 2006/0250463 A1 | 11/2006 | Nakazawa et al. | 347/100 |

FOREIGN PATENT DOCUMENTS

| | | |
|---|---|---|
| JP | 2002-161218 | 6/2002 |
| JP | 2004-033901 | 2/2004 |

OTHER PUBLICATIONS

E. Gulari, et al., "Photon Correlation Spectroscopy of Particle Distributions", J. Chem. Phys. 70(8) (1979) pp. 3965-3972.

*Primary Examiner*—Edward J Cain
(74) *Attorney, Agent, or Firm*—Fitzpatrick, Cella, Harper & Scinto (57) ABSTRACT

A process for producing a colorant comprises the step of mixing a coloring material and a block copolymer in a flow channel of a microreactor to obtain a dispersion comprising a colorant as a dispersoid. The flow-mixing channel may have a cross-sectional area of not less than 0.5 mm$^2$, and the ratio of the total cross-sectional areas of flow channels connected with the flow-mixing channel to the cross-sectional area of the flow-mixing channel ranges from 0.01 to 0.1, and a rectangular cross-section having a ratio of a flow channel depth to a flow channel width of not less than 0.5.

15 Claims, 5 Drawing Sheets

PROCESS FOR PRODUCING COLORANT DISPERSOID

BACKGROUND OF THE INVENTION

1. Field of the Invention

The present invention relates to a process for producing a colorant dispersoid in which a coloring material is dispersed with a block copolymer.

2. Related Background Art

Various aqueous dispersions containing a functional substance are well known: the functional substance including pesticides such as herbicides, and insecticides; medicines such as anticancer agents, antiallergic agents, and anti-inflammatory agents; and coloring matters for preparations such as inks and toners.

In recent years, digital printing techniques are developing rapidly. The digital techniques are typified by electrophotography techniques and inkjet techniques. The digital printing techniques are becoming more and more important in image formation in offices and homes.

Among the digital printing techniques, the inkjet printing techniques are characterized, as a direct recording method, by compactness of the apparatus, and low power consumption. The inkjet techniques are being improved rapidly in the image quality by making the nozzles finer. In an example of the inkjet techniques, ink supplied from an ink tank to a nozzle is heated by a heater in the nozzle and is allowed to evaporate and bubble to eject the ink from the nozzle to form an image on a recording medium. In another example of the inkjet techniques, the ink is ejected from the nozzle by vibration of a piezo element.

These inkjet methods usually use an aqueous dye solution as the ink. The aqueous ink tends to run on overlapping of the colors, or may cause feathering at the recording position on the recording medium along a paper fiber direction. To cancel such disadvantages, U.S. Pat. No. 5,085,698 discloses use of a pigment dispersion ink. This patent disclosure uses a pigment dispersion ink containing pigment particles stabilized by an AB-type or ABA-type block copolymer and an aqueous solvent. The pigment inks are produced in the working examples by use of a flask and a beaker.

U.S. Patent Publication No. 2002/040662A1 discloses a process for producing a pigment dispersion by collision of fluids ejected from nozzles in a reactor chamber. In this disclosed process, suspension liquids containing a crude pigment, a dispersion-stabilizing liquid, and a liquid medium are ejected through counterposed nozzles in the reactor chamber and brought into collision together to pulverize and disperse the crude pigment. However, this method needs further improvement for steady preparation of dispersion of finer-sized particles.

Microreactors are known as small-sized chemical devices of a three-dimensional structure utilizing a phenomenon in a microscopic space for reaction or mixing. The microreactor includes reactors and mixers having plural microscopic flow channels (hereinafter referred to as "a microchannel", or "microchannels"). Examples are disclosed in literature such as "Microreactors New Technology for Modern Chemistry" (Wolfgang Ehrfeld, Volker Hassel, Holger Loewe; WILEY-VCH Co. 2000)

A process for producing effectively a solution of a metal colloid of a small particle size is disclosed in Japanese Patent Application Laid-Open No. 2004-33901. This patent document discloses a process for producing a metal colloid solution by reducing a metal compound in the presence of a polymeric dispersant for a pigment in a microreactor. The patent document describes effective production of a metal colloid of a small particle size, but discloses neither production of a colorant having a fine particle size nor use of a block copolymer as a dispersant for production thereof.

The present invention is made, on the aforementioned technical background, to provide a process for producing, by use of a microreactor, a colorant dispersoid of a small particle size comprising a coloring material and block copolymer.

SUMMARY OF THE INVENTION

According to an aspect of the present invention, there is provided a process for producing a colorant, comprising the step of mixing a coloring material and a block copolymer in a flow channel of a microreactor to obtain a dispersion comprising a colorant as a dispersoid.

Synthesis, precipitation, or crystallization of the colorant may be conducted in the flow channel of the microreactor.

The flow channel preferably has a width ranging from 30 µm to 1000 µm.

A fluid containing the coloring material and a fluid containing the block copolymer are preferably introduced through their respective separate flow channels to a fluid-mixing channel, and the fluids are brought into contact with each other in the fluid-mixing channel(i.e., flow-mixing channel). The contact of the fluids with each other are preferably in a laminar flow state. Alternatively, the contact of the fluids with each other are preferably caused in a turbulent flow state. In this case, the flow-mixing channel preferably has a cross-sectional area of not less than 0.5 mm$^2$, and the ratio of the total cross-sectional areas of flow channels connected with the flow-mixing channel to the cross-sectional area of the flow-mixing channel ranges from 0.01 to 0.1.

The flow-mixing channel preferably has a rectangular cross-section having a ratio of a flow channel depth to a flow channel width of not less than 0.5.

The block copolymer is preferably amphiphilic.

The block copolymer preferably comprises ionic repeating units.

The block copolymer preferably comprises polyalkenyl ether structure.

The step of mixing a coloring material and a block copolymer preferably comprises enclosing the coloring material in the block copolymer.

The colorant preferably has an average particle size of not more than 100 nm.

The mixing is preferably conducted in a liquid containing an aqueous liquid, and the colorant comprised of the coloring material and the block copolymer is dispersed in the aqueous liquid.

The formed dispersion is preferably mixed with a dispersing medium.

The dispersion is preferably mixed with the dispersing medium in the flow channel.

The process of the present invention mixes a coloring material and a block copolymer in a microchannel in a microreactor. In this process, fluids are mixed in a short distance and short time of diffusion between the fluids to form dispersed particles of small sizes produced. Further in this process, the mixing is conducted in a microchannel of a fine channel width of a microreactor in a laminar flow state or a turbulent flow state, which enables steady and continuous production of a uniform particle dispersion. Furthermore, desired functions can be given to the blocks of the block copolymer used as a dispersant to meet the use of the colorant product.

DETAILED DESCRIPTION OF THE PREFERRED EMBODIMENTS

Generally, a flow of a fluid is known to become an instable laminar flow at a Reynolds number larger than 1000, and to become a turbulent flow at a Reynolds number of larger than 2000.

When two laminar flows of the liquids flowing in the same direction are brought into contact with each other with the respective laminar flow state maintained, the two fluids come to be mixed by diffusion through the interface, not by mechanical mixing.

According to Fick's law, the time for mixing by diffusion is proportional to the square of the diffusion distance. Therefore, the time for the mixing by molecular diffusion can be made shorter by narrowing the flow channel to decrease the diffusion distance. Specifically, decrease of the flow channel width to 1/10 will shorten the mixing time to 1/100.

On the other hand, in the mixing of two kinds of laminar flow fluids by diffusion through the fluid interface, the mixing efficiency is higher at a larger specific interface area, i.e. a larger ratio of the area of the interface to the volume of the fluids forming the interface.

The width of the flow channel of the microreactor ranges from several micrometers to hundreds or thousands of micrometers. Such a microscopic flow channel is called "a microchannel" in this Specification. Since the microchannel has small cross-sectional dimensions, and the flow rate of the fluid flowing through the flow channel is low, the Reynolds numbers of the fluids are small. Therefore, the fluid flowing through the microchannel of the microreactor is in a state of a laminar flow, being different from the turbulent fluid flowing through a bulk-sized flow channel of a usual reactor.

The volume of the flow channel of the microreactor is much smaller than that of the bulk-sized flow channel of a usual reactor. Therefore, use of a microreactor is much more advantageous for diffusion mixing between laminar flows than use of a bulk-sized reactor, since the microreactor can readily make the flow laminar and realize high diffusion efficiency. Therefore, use of the microreactor enables instantaneous mixing of a short-lived chemical or reaction-intermediate with the desired function or activity kept retained to shorten the reaction time such as decomposition, excessive polymerization, salting out, acid deposition, and solidification.

The process for producing a colorant dispersoid of the present invention employs a microreactor for obtaining a dispersed system comprising a colorant as a dispersoid which is formed by mixing a coloring material and a block copolymer.

The microreactor employed in the present invention is provided with a microchannel for contacting and mixing plural fluids (hereinafter referred to as "a flow-mixing channel"). FIGS. 1 to 9 show Examples of the microchannel of the microreactor. The configuration or structure of the microchannel is not limited thereto. For instance, a commercial microreactor produced by IMM (Institute fur Mikrotechnik Mianz) is useful.

The cross-section perpendicular to the flow direction of the flow-mixing channel may be rectangular. The ratio of the adjacent sides of the rectangle is preferably 0.5 or higher. In the present invention, the length of the side perpendicular to the interface of the two contacting liquids to be mixed is called a flow channel width, and the length of the side perpendicular to the flow channel width direction is called a flow channel depth. The flow-mixing channel more preferably has a rectangular cross-section having a ratio of a flow channel depth to a flow channel width of not less than 0.5.

The width of the flow-mixing channel is preferably not more than 1000 μm, more preferably not more than 500 μm, still more preferably not more than 200 μm, still more preferably not more than 100 μm. The lower limit of the flow channel is considered to be 30 μm in view of the technique of the flow channel production and the particle size of the dispersed particles.

The depth of the flow-mixing channel is preferably larger to decrease the diffusion distance and to obtain a larger specific interface area. Specifically, the ratio of the depth to the width of the flow channel is not less than 0.5, more preferably not less than 1, still more preferably not less than 5, still more preferably not less than 10. The larger depth of the flow-mixing channel gives a larger sectional area, enabling a larger amount of the fluid to flow.

In the mixing process in the present invention, the coloring material may be formed by synthesis, precipitation, or crystallization. In other words, the coloring material may be synthesized, precipitated, or crystallized in the flow channel of the microreactor. A fluid containing a coloring material and another fluid containing a block copolymer are introduced from their respective separate flow channels to a flow-mixing channel, and the fluids are mixed by contact in the flow-mixing channel. (Hereinafter, each of such flow channels joining to the flow-mixing channel is called a "tributary channel".)

The sectional area of the flow-mixing channel is preferably not less than 0.5 mm², and the ratio of the sum of the sectional areas of the tributary channels to the sectional area of the flow-mixing channel ranges preferably from 0.01 to 0.1. Here the sectional area of a flow channel is the area of the cross-section of the flow channel cut at a plane perpendicular to the flow direction of the fluid.

In the mixing process, the coloring material and the block copolymer may be mixed either in a laminar flow state or in a turbulent flow state. For example, in an embodiment of the present invention, a solid-gas dispersed system comprising a dispersed coloring material as a dispersoid and a solid-gas dispersed system comprising a dispersed block copolymer as a dispersoid are mixed in a turbulent state in the flow-mixing channel, and the resulting dispersed system is brought into contact with a third dispersing medium to obtain a final dispersed system.

The block copolymer may be amphiphilic.

The block copolymer may comprise ionic repeating units.

The block copolymer may comprise a polyalkenyl ether structure. That is, the repeating unit comprising the block copolymer may include a precursor for the polyalkenyl ether structure.

The colorant produced according to the process of the present invention may have a structure in which a coloring material is enclosed by a block copolymer.

The dispersed colorant as a dispersoid may have an average particle size of 100 nm or less.

The present invention includes a dispersed system which is produced by mixing the coloring material with a block copolymer in a liquid containing an aqueous liquid and in which the resulting colorant is dispersed in the aqueous liquid. The aqueous liquid constitutes a dispersing medium for the colorant. Thus the present invention includes also an embodiment in which a coloring material or a block copolymer, or both are fed in a state of a composition comprising the aqueous liquid to the flow-mixing channel and the final dispersion is comprised of the colorant resulting from the mixing as a dispersoid, and the dispersing medium of which final dispersion is comprised of the aqueous liquid.

In the primary embodiment of the present invention, a medium of the fluid containing the coloring material and a medium of the fluid containing the block copolymer comprises the dispersing medium of the resulting dispersed system. However, the present invention includes an embodiment in which a coloring material and a block copolymer are mixed and then the resulting mixture is mixed with a dispersing medium.

The present invention further includes an embodiment in which a coloring material and a block copolymer are mixed to form a dispersed system and the dispersed system is mixed with an additional dispersing medium.

The process of mixing the mixture or the dispersed system with a dispersing medium may be conducted in the flow-mixing channel for mixing the coloring material and the block copolymer, or in another separate flow channel.

The present invention is explained more specifically by reference to examples.

The material for constructing the flow channel in the present invention includes metals, glass, silicon, Teflon®, ceramics, and plastics. In the case where heat resistance, pressure resistance, and solvent resistance are required, the material is selected from metals, glass, silicon, Teflon®, and ceramics; preferably metals. The metals include stainless steel, Hastelloy® (Ni—Fe type alloy), nickel, gold, platinum, and tantalum. However, the metallic material for the flow channel of the microreactor is not limited thereto.

The surface of the flow channel may be lined for improving the corrosion resistance or adjusting the surface energy of the flow channel.

In a micro scale space, molecule transportation, reaction, and separation will proceed rapidly by spontaneous behavior of the molecules without mechanical agitation. Therefore, the reaction can proceed in a laminar flow in the microreactor at a higher rate than in a turbulent flow in a conventional macro reaction apparatus. Further, uniformity of the mixing and regularity of the reaction can be maintained by bringing the two liquids invariably at constant timing and allowing the mixing or reaction to proceed in a laminar flow. In the present invention, the mixing of the two fluids in the micro space is not limited to be conducted in a laminar flow condition, but may be conducted in a turbulent flow condition. In particular, for mixing a substance having a high molecular weight and low diffusiveness and a substance having high diffusiveness, the mixing velocity can be higher in turbulent flow conditions than in laminar flow conditions in some cases.

For example, for effective formation of a turbulent flow, a microreactor in which plural tributaries are joined to a flow-mixing channel has the sectional area of the flow-mixing channel of preferably not less than 0.5 mm$^2$, and the ratio of the total sectional area of the tributaries to the sectional area of the flow-mixing channel ranges preferably from 0.01 to 0.1.

By particle-forming reaction in such a microreactor, fine particles of a small primary particle size can be formed since the reaction occurs instantaneously to form many nuclei to grow many particles. Therefore, fine coloring material particles having small primary particle sizes can be obtained by conducting synthesis, precipitation, or crystallization of the coloring material by use of the microreactor, the particle size distribution being narrower owing to regularity of the reaction. In this process, particle nuclei are formed by rapid reaction in the flow channel of a micro scale, not by pulverization. Therefore, a micro-jet reactor like that used in Japanese Patent Application Laid-Open No. 2002-161218 need not be used, whereby freedom in selection of the structure of the microreactor is increased. Mass production of the colorant dispersoid can be conducted by arranging the microreactors in parallel in accordance with the required production amount.

Mixing of a coloring material and a block copolymer by use of a microreactor improves regularity of dispersion of the colorant and making uniform the resulting particle sizes. Further, use of an amphiphilic block copolymer stabilizes the enclosure of the coloring material by the block copolymer. For enclosure of the coloring material, the polymer micelle-forming property of the amphiphilic copolymer constituting the block copolymer gives a satisfactory enclosure state or dispersion stability.

The amphiphilicity of the block copolymer increases freedom in selection of the solvents employed on the coloring material side and the block copolymer side, enabling selection of combination of the solvents for effective dispersion. The block copolymer has a polyalkenyl ether structure as the repeating units. Preferably, use of a copolymer containing a polyvinyl ether structure gives high dispersion stability. By such treatment by a microreactor, a colorant dispersoid can readily be produced which has the coloring material enclosed in the block copolymer with particles of uniform small sizes. In particular, the process of the present invention is effective for producing a colorant dispersoid which can be affected greatly in performance of the coloring material by the size and size-distribution of the dispersed particles.

In the present invention, the coloring material includes granular solids like pigments, and dye compounds.

The colorant includes pigments as mentioned above: pigments including achromatic inorganic pigments, chromatic organic pigments, and chromatic inorganic pigments; colorless or pale colored pigments; and metallic glossy pigments. Otherwise, a new pigment may be synthesized for use in the present invention. Specific examples of the pigments are shown below.

Black pigments include Raven 1060, Raven 1080, Raven 1170, Raven 1200, Raven 1250, Raven 1255, Raven 1500, Raven 2000, Raven 3500, Raven 5250, Raven 5750, Raven 7000, Raven 5000 ULTRAII, and Raven 1190 ULTRAII (Columbia Carbon Co.); Black Pearls L, Mogul-L, Regal 1400R, Regal 660R, Regal 330R, Monarch 800, Monarch 880, Monarch 900, Monarch 1000, Monarch 1300, and Monarch 1400 (Cabot Co.); Color Black FW1, Color Black FW2, Color Black FW200, Color Black 18, Color Black S160, Color Black S170, Special Black 4, Special Black 4A, Special Black 6, Printex 35, Printex U, Printex 140U, Printex V, and Printex 140V (Degussa Co.); and No. 25, No. 33, No. 40, No. 47, No. 52, No. 900, No. 2300, MCF-88M, MA600, MA7, MA8, and MA100 (Mitsubishi Chemical Co.), but are not limited thereto.

Cyan pigments include C.I. Pigment Blue C.I. Pigment Blue-1, C.I. Pigment Blue-2, C.I. Pigment Blue-3, C.I. Pigment Blue-15, C.I. Pigment Blue-15:2, C.I. Pigment Blue-15:3, C.I. Pigment Blue-15:4, C.I. Pigment Blue-16, C.I. Pigment Blue-22, and C.I. Pigment Blue-60.

Magenta pigments include C.I. Pigment Red-5, C.I. Pigment Red-7, C.I. Pigment Red-12, C.I. Pigment Red-48, C.I. Pigment Red-48:1, C.I. Pigment Red-57, C.I. Pigment Red-112, C.I. Pigment Red-122, C.I. Pigment Red-123, C.I. Pigment Red-146, C.I. Pigment Red-168, C.I. Pigment Red-184, C.I. Pigment Red-202, and C.I. Pigment Red-207.

Yellow pigments include C.I. Pigment Yellow-12, C.I. Pigment Yellow-13, C.I. Pigment Yellow-14, C.I. Pigment Yellow-16, C.I. Pigment Yellow-17, C.I. Pigment Yellow-74, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow-128, C.I. Pigment Yellow-129, C.I. Pigment Yellow-151, and C.I. Pigment Yellow-154.

Dyes are useful similarly as pigments in the present invention. The useful dyes include C.I. Solvent Blue-33, -38, -42, -45, -53, -65, -67, -70, -104, -114, -115, and -135; C.I. Solvent Red-25, -31, -86, -92, -97, -118, -132, -160, -186, -187, and -219; and C.I. Solvent Yellow-1, -49, -62, -74, -79, -82, -83, -89, -90, -120, -121, -151, -153, and -154.

Water-soluble dyes are also useful. The water-soluble dyes include direct dyes such as C.I. Direct Black-17, -19, -22, -32, -38, -51, -62, -71, -108, -146, and -154; C.I. Direct Yellow-12, -24, -26, -44, -86, -87, -98, -100, -130, and -142; C.I. Direct Red-1, -4, -13, -17, -23, -28, -31, -62, -79, -81, -83, -89, -227, -240, -242, and -243; C.I. Direct Blue-6, -22, -25, -71, -78, -86, -90, -106, and -199; C.I. Direct Orange-34, -39, -44, -46, and -60; C.I. Direct Violet -47, and -48; C.I. Direct Brown-109; C.I. Direct Green-59. The water-soluble dyes include also acid dyes such as C.I. Acid Black-2, -7, -24, -26, -31, -52, -63, -112, -118, -168, -172, and -208; C.I. Acid Yellow-11, -17, -23, -25, -29, -42, -49, -61, and -71; C.I. Acid Red-1, -6, -8, -32, -37, -51, -52, -80, -85, -87, -92, -94, -115, -180, -254, -256, -289, -315, and -317; Acid Blue-9, -22, -40, -59, -93, -102, -104, -113, -117, -120, -167, -229, -234, and -254; C.I. Acid Orange-7, and -19; and C.I. Acid Violet-49. The water-soluble dyes also includes reactive dyes such as C.I. Reactive Black-1, -5, -8, -13, -14, -23, -31, -34, and -39; C.I. Reactive Yellow-2, -3, -13, -15, -17, -18, -23, -24, -37, -42, -57, -58, -64, -75, -76, -77, -79, -81, -84, -85, -87, -88, -91, -92, -93, -95, -102, -111, -115, -116, -130, -131, -132, -133, -135, -137, -139, -140, -142, -143, -144, -145, -146, -147, -148, -151, -162, and -163; C.I. Reactive Red-3, -13, -16, -21, -22, -23, -24, -29, -31, -33, -35, -45, -49, -55, -63, -85, -106, -109, -111, -112, -113, -114, -118, -126, -128, -130, -131, -141, -151, -170, -171, -174, -176, -177, -183, -184, -186, -187, -188, -190, -193, -194, -195, -196, -200, -201, -202, -204, -206, -218, and -221; C.I. Reactive Blue-2, -3, -5, -8, -10, -13, -14, -15, -18, -19, -21, -25, -27, -28, -38, -39, -40, -41, -49, -52, -63, -71, -72, -74, -75, -77, -78, -79, -89, -100, -101, -104, -105, -119, -122, -147, -158, -160, -162, -166, -169, -170, -171, -172, -173, -174, -176, -179, -184, -190, -191, -194, -195, -198, -204, -211, -216, and -217; C.I. Reactive Orange-5, -7, -11, -12, -13, -15, -16, -35, -45, -46, -56, -62, -70, -72, -74, -82, -84, -87, -91, -92, -93, -95, -97, and -99; C.I. Reactive Violet-1, -4, -5, -6, -22, -24, -33, -36, and -38; C.I. Reactive Green-5, -8, -12, -15, -19, and -23; C.I. Reactive Brown-2, -7, -8, -9, -11, -16, -17, -18, -21, -24, -26, -31, -32, and -33. The water-soluble dyes further include C.I. Basic Black-2; C.I. Basic Red-1, -2, -9, -12, -13, -14, and -27; C.I. Basic Blue-1, -3, -5, -7, -9, -24, -25, -26, -28, and -29; Basic Violet-7, -14, and -27; and C.I. Food Black-1, and -2.

The dye may be a known dye or a novel dye. The useful dyes include water-soluble dyes of direct dyes, acid dyes, basic dyes, reactive dyes, and food dyes; fat-soluble dyes (oil-soluble dyes); and insoluble dyes such as disperse dyes. The dye may be used in a solid state. For such uses, oil-soluble dyes are useful.

In the present invention, the coloring material is characteristically enclosed in a block copolymer physically. A preferred type of the enclosure by the block copolymer is enclosure in micelles of the block copolymer. The coloring material, which is preferably a pigment, is stabilized in the dispersibility and functionality by enclosure with the block copolymer.

The oil-soluble dye in the present invention is a dye which is soluble in an organic solvent, and is called also a fat-soluble dye.

The block copolymer characteristically used in the present invention is explained below.

The block copolymers useful in the present invention include specifically acrylic and methacrylic block copolymers, block copolymers of polystyrene and another addition-polymerized or condensation-polymerized polymer, and block copolymers having polyoxyethylene blocks or polyoxyalkyene blocks. Conventionally known block copolymers are also useful. In the present invention, the block copolymer is of a block type preferably of AB, ABA, of ABD, where A, B, and D indicate respectively different block segments. The block copolymer used in the present invention is preferably amphiphilic. A preferred type of the block copolymer is an AB di-block copolymer constituted of a hydrophobic segment, and a hydrophilic segment having a unit of an organic acid or ionic salt thereof. Another preferred type of the block copolymer is an ABC tri-block copolymer constituted of a hydrophobic segment, a hydrophilic segment having a unit of an organic acid or ionic salt thereof, and still another segment. An ABC tri-block copolymer is preferred in which A is a hydrophobic segment, B is a nonionic hydrophilic segment, and C is a hydrophilic segment having a unit of an organic acid or ionic salt thereof. This type of block copolymer is preferred for stabilization of the enclosure state. For example, in a dispersion liquid prepared from the above-mentioned ABC tri-block copolymer, a coloring material, and water as the solvent, the coloring material can be enclosed in micelles of the ABC block copolymer. Thus, a colorant-enclosure type of ink composition can be formed. The particle size distribution of the dispersed particles of the dispersion composition can be made uniform, and the dispersion state can be made highly stable. By conducting the treatment by a microreactor, the uniformity of the particle sizes of the colorant dispersoid can be further improved.

An amphiphilic block copolymer is used preferably in the present invention. For example, from the repeating unit structure shown by General Formula (1), a hydrophobic block segment and a hydrophilic block segment can be selectively synthesized.

General Formula (1)

[in the Formula, $R^1$ is selected from linear, branched or cyclic alkyls of 1-18 carbons, —(CH($R^2$)—CH($R^3$)—O)$_l$—$R^4$, and —(CH$_2$)$_m$—(O)$_n$—$R^4$, where l and m are independently an integer of 1-12; n is 0 or 1; $R^2$ and $R^3$ are independently H or CH$_3$; $R^4$ is selected from H, linear, branched or cyclic alkyls of 1-6 carbons, Ph, Pyr, Ph-Ph, Ph-Pyr, —CHO, —CH$_2$CHO, —CO—CH=CH$_2$, —CO—C(CH$_3$)=CH$_2$, —CH$_2$COOR$^5$, and when $R^4$ is not H, a hydrogen atom on the carbon atoms may be substituted by a linear or branched alkyl of 1-4 carbons, F, Cl, or Br, and the carbon atom in the aromatic ring may respectively be substituted by a nitrogen atom; and $R^5$ is H or an alkyl of 1-5 carbons.

In the present invention, -Ph denotes a phenyl, -Pyr denotes pyridyl, -Ph-Ph denotes a biphenyl, and -Ph-Pyr denotes pyridylphenyl. The pyridyl, biphenyl, and pyridylphenyl may be any of possible positional isomers.

The block copolymer used in the present invention has a molecular weight distribution (=Mw/Mn: (weight-average molecular weight)/(number–average molecular weight)) of preferably not more than 2.0, more preferably not more than 1.6, still more preferably not more than 1.3, still more preferably not more than 1.2; and a number-average molecular weight Mn ranging from 1000 to 300,000. The block copolymer having the number-average molecular weight Mn in the range from 1000 to 300,000 can disperse the intended functional material in a solvent.

For improvement of dispersion stability and enclosure capability, the block copolymer-molecule is preferably flexible to have higher affinity to the surface of the coloring material for physical entanglement. Further, as described later, the flexibility is desirable to facilitate formation of a coating layer on a recording medium. In particular, for use as an ink, the flexibility is desirable to facilitate formation of a coating layer of the copolymer on a recording medium. The coating layer formed from the block copolymer is capable of protecting the enclosed colorant from oxidation and photodeterioration to improve environmental resistance. For the flexibility, the main chain of the block copolymer has a glass transition temperature Tg of not higher than 20° C., more preferably not higher than 0° C., still more preferably not higher than −20° C. From this reason also, a polymer having a polyvinyl-ether structure is preferred owing to its low glass transition temperature and molecular flexibility.

In the present invention, since a pigment is used preferentially as the coloring material, the hydrophobic segment has preferably an aromatic structure, more preferably a structure having a group of phenyl, phenylene, or the like for dispersion stability by affinity to the coloring material. Further, for stabilization of the enclosure, the polymer moiety of the core portion, namely the hydrophobic segment portion, has preferably a molecular weight of higher than a certain level: at least a number-average molecular weight of not lower than 7000, more preferably not lower than 10000, still more preferably not lower than 12000.

The amphiphilic block copolymer as described above enables dispersion both in an aqueous solvent and in an oily solvent.

This increases freedom in selection of the solvents for the coloring material side and for the block copolymer side for efficient dispersion formation.

A block copolymer having an ionic unit is preferably used in the present invention. The ionic units retard flocculation of the dispersed particles. Further, in mixing a block copolymer having an ionic unit with another block copolymer, salting-out of a block copolymer is retarded and increase of the particle size of the dispersed particles is also retarded even at a higher pH.

In the present invention, preferably used is a block copolymer containing a polyalkenyl-ether structure, particularly a block copolymer containing a polyvinyl-ether structure.

The block copolymer having the polyalkenyl-ether structure may be a copolymer constituted of a polyvinyl ether and another polymer.

The block copolymer containing the vinyl-ether structure used preferably has a repeating unit represented by General Formula (1) above.

Examples of the vinyl ether monomer as the repeating unit of the polyvinyl-ether structure of the block copolymer are shown below without limiting the polyvinyl ether structure thereto. In the formulas, Me is methyl, Et is ethyl, and i-Pr is isopropyl.

For the aforementioned dispersion stability, the block copolymer to be used is particularly preferred which has a polyvinyl-ether unit structure having a low glass transition point and high molecular mobility.

Examples of the structure of the polyvinyl ether constituted of the above vinyl-ether monomer are shown below without limiting the polymer thereto.

In the above polyvinyl ethers, the symbols u and v representing the repeating unit numbers are independently a numeral preferably not more than 10,000, and the sum (u+v) is preferably in the range from 10 to 20,000.

The polyvinyl ether copolymer is preferred also by the reasons that the polyvinyl ether copolymer can be synthesized by cationic living polymerization with precise control of the molecular weight and molecular weight distribution, and is capable of forming stable polymer micelles.

The colorant dispersoid of the present invention is characterized by enclosure of a coloring material by a block copolymer. The enclosure state can be formed, for example, by mixing a solution of a coloring material in a water-insoluble organic solvent with micelles formed from a block copolymer in water, and subsequently distilling off the organic solvent. In another method, the enclosure state can be formed by dissolving a polymer and a coloring material in an organic solvent and causing phase inversion to aqueous solvent: the organic solvent may be distilled off. In still another method, the enclosure state can be formed by mixing a dispersion of a pigment in a water-insoluble organic solvent with micelles formed from a block copolymer in water.

The coloring material enclosed in the block copolymer in the present invention is contained in the range preferably from 0.01 to 90 wt % based on the weight of the colorant dispersoid. At the content of the coloring material of from 0.01 to 90 wt %, the coloring material exhibits sufficient performance and is dispersed satisfactorily. More preferably the content ranges from 0.1 to 80 wt %, still more preferably from 0.3 to 70 wt %.

When the colorant of the present invention is used in a pigment ink, and plural kinds of coloring materials are used for the colorant, the coloring materials are not limited in the ratio. However, the respective coloring materials are contained preferably in an amount of not less than 0.1 wt %, preferably not less than 1 wt % of the entire coloring material. In formation of dispersion of coloring materials, the coloring materials are used preferably in the above concentrations and proportions.

In enclosure of the coloring material, excellent enclosure state, or excellent dispersion stability can be achieved by the stable polymer micelle formation of the block copolymer. The block copolymer is preferred also for uniform micelle formation. Use of a microreactor for the treatment for the micelle formation enables uniform micelle formation for colorant dispersoid having uniform particle size distribution.

The colorant dispersoid of the present invention contains particles having an average particle size of preferably not more than 100 nm. In the case where the coloring material is a colorant, a smaller particle size of the colorant will give a composition producing excellent color tint. When a colorant dispersoid composition is used in an ink composition, the particle size and uniformity thereof will significantly affect the dispersion stability, coloring power, and color sharpness of the colorant dispersoid ink. A much larger size of the particles dispersed in the solvent may cause flocculation of the particles to prevent stable dispersion. Since the particle size and the coloring power are inversely proportional to each other (Annalen der Physik, vol. 25, p. 377, 1908), excessively large particle size may lower the coloring power. Accordingly, as described above in the present invention, the average particle size is preferably not more than 100 nm, more preferably not more than 50 nm. As a measure of uniformity of particle size, generally used is the distribution index proposed by Gulari et al. (The Journal of Chemical Physics, vol. 70, p. 3965, 1979). The distribution index is preferably not more then 0.3, more preferably not more than 0.2, still more preferably not more than 0.1. A smaller distribution index signifies a narrower particle size distribution.

The colorant dispersoid is dispersed preferably in an aqueous solvent. The aqueous solvent includes polyhydric alcohols such as ethylene glycol, diethylene glycol, triethylene glycol, polyethylene glycol, propylene glycol, polypropylene glycol, and glycerin; polyhydric alcohol ethers such as ethylene glycol monomethyl ether, ethylene glycol monoethyl ether, ethylene glycol monobutyl ether, diethylene glycol monoethyl ether, and diethylene glycol monobutyl ether; nitrogen-containing solvents such as N-methyl-2-pyrrolidone, substituted pyrrolidones, and triethanolamine. Monohydric alcohols such as methanol, ethanol, and isopropyl alcohol are also useful. The pH of the water is not limited, but is preferably ranges from 1 to 14.

EXAMPLES

The present invention is explained below by reference to Examples without limitation to Examples.

Example 1

Figure 2:
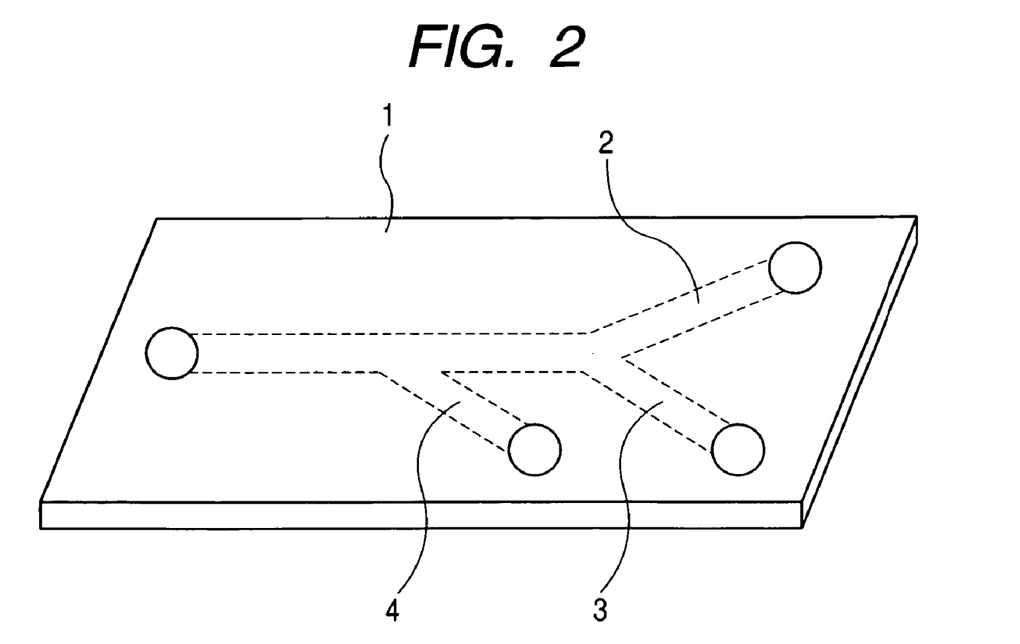
FIG. 2 is a perspective view of another microreactor applicable in the present invention.
Figure 6:
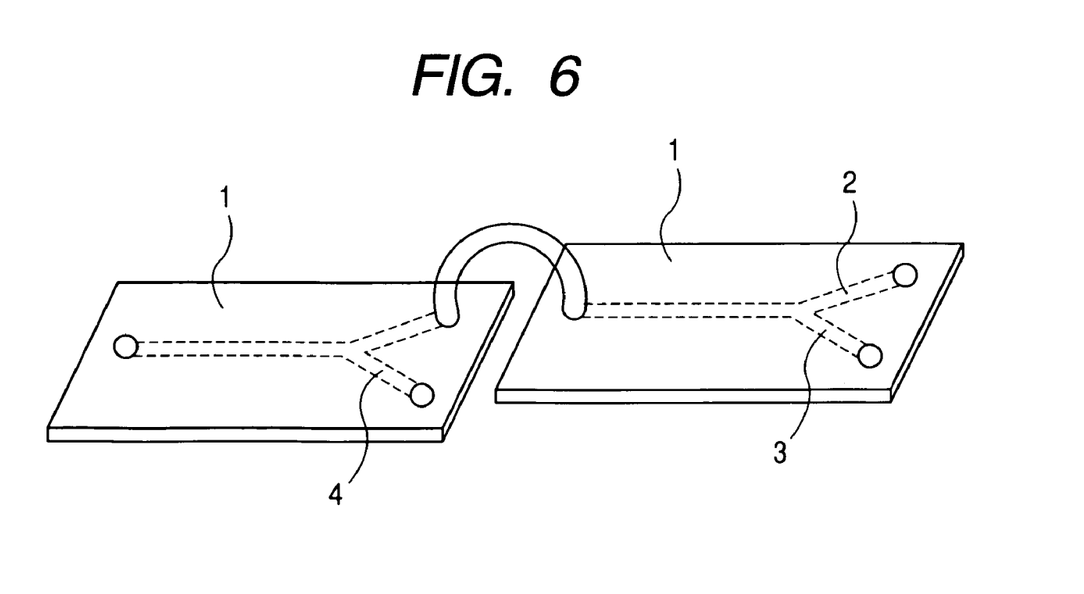
FIG. 6 is a perspective view of still another microreactor applicable in the present invention.

This Example employs microreactor 1 for mixing three liquids shown in FIG. 2. With this microreactor, fluid 1 introduced through first flow channel 2 and fluid 2 introduced through second flow channel 3 are mixed, and therewith fluid 3 introduced through third flow channel 4 is mixed. The flow channel for mixing fluid 1 introduced through first flow channel 2 and fluid 2 introduced through second flow channel 3 has a width of 30 μm and a depth of 15 μm. The flow channel for mixing fluid 3 introduced through third flow channel 4 with the above mixture of fluid 1 and fluid 2 has a width of 30 μm and a depth of 15 μm. Otherwise, microreactors for two-liquid mixing may be connected as shown in FIG. 6.

In this Example, the coloring material is Oil Yellow (Orient Chem. Co.), an oil-soluble dye.

A portion of 7 weight parts of Oil Yellow (Orient Chemical Co.), a fat-soluble dye, is dissolved in 25 weight parts of tetrahydrofuran to prepare a solution (fluid 1). The block copolymer used is formed from 2-(4-methylphenyl)ethyl vinyl ether units for segment A, 2-(2-methoxyethyloxy)ethyl vinyl ether units for segment B, and ethyl 4-(2-vinyloxy) ethoxybenzoate units for segment C at a copolymerization molar ratio of A/B/C=90/80/14, with the ethyl benzoate groups of segment C deprotected.

A portion of 10 weight parts of this tri-block copolymer is dissolved in 25 weight parts of tetrahydrofuran to prepare a solution (fluid 2). Fluid 1 is introduced through first flow channel 2 at a flow rate of 2.5 μL/min, and fluid 2 is introduced through second flow channel 3 at a flow rate of 2.5 μL/min. The two introduced fluids flowing in laminar flows are partly brought into contact to be mixed uniformly. To this liquid mixture of fluid 1 and fluid 2, 700 weight parts of an aqueous 0.01-mol/L potassium hydroxide solution (fluid 3) is introduced through third flow channel 4 at a flow rate of 5 μL/min. Thereby the coloring material comes to be enclosed instantaneously by the tri-block copolymer to form uniformly many small micelles. The micelles have an average particle size of 97 nm with size distribution index of 0.098. The dispersion is stable, forming no deposit during storage. This dispersion containing the fat-soluble dye as the coloring material is used as an inkjet ink. This dispersion is loaded in an ink tank of a BJ printer S530 (Canon K.K.) and printing is conducted on a plain paper sheet. The printed letters are fine and have improved light resistance.

Comparative Example 1

An inkjet ink is prepared in the same manner except that a beaker is used as the reactor in place of the microreactor and stirring is conducted with a mechanical stirrer. The dispersion has an average particle size of 150 nm with size distribution index of 0.252.

Example 2

Figure 1:
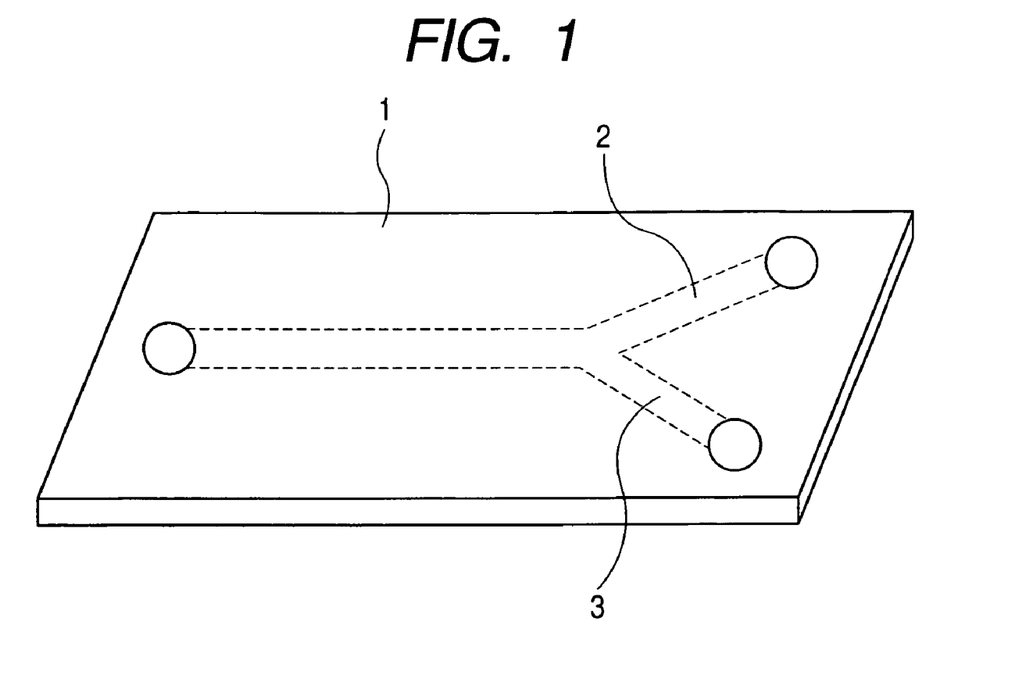
FIG. 1 is a perspective view of a microreactor applicable in the present invention.

This Example employs microreactor 1 for two-liquid mixing shown in FIG. 1, and microreactor 1 shown in FIG. 2 used in Example 1.

Copper phthalocyanine, a pigment, is used as the coloring material in this Example.

To a portion of 8 weight parts of crude copper phthalocyanine, is added 120 weight parts of concentrated sulfuric acid for dissolution to prepare a paste liquid (fluid 1). In the first step, microreactor 1 for mixing two liquid shown in FIG. 1 is used. The flow channel for mixing fluid 1 introduced through first flow channel 2 and fluid 2 introduced through second flow channel 3 has a width of 30 μm and a depth of 15 μm. Fluid 1 is introduced through first flow channel 2 at a flow rate of 2.5 μL/min, and 400 weight parts of water (fluid 2) which is a poor solvent for copper phthalocyanine is introduced through second flow channel 3 at a flow rate of 2.5 μL/min. The two fluids flowing in laminar flows are partly brought into contact to form particles of copper phthalocyanine. The reaction proceeds instantaneously to form many nuclei, and many particles grow therefrom, whereby fine particles are formed having small primary particle sizes. Since the flows are laminar, the two fluids are brought into contact at a constant timing to cause particle-deposition reaction regularly. The formed particles have an average particle size of 50 nm with a narrow particle size distribution.

In the next step, microreactor 1 is employed for mixing three liquids shown in FIG. 2.

In this Example, the block copolymer used is formed from 2-(4-methylphenyl)ethyl vinyl ether units for segment A, 2-(2-methoxyethyloxy)ethyl vinyl ether units for segment B, and ethyl 4-(2-vinyloxy)ethoxybenzoate/units for segment C at a copolymerization molar ratio of A/B/C=90/80/14, with the ethyl benzoate group of Segment C deprotected by sodium hydroxide.

A portion of 6 weight parts of this tri-block copolymer is dissolved in 47 weight parts of N,N-dimethylformamide to obtain a block copolymer solution (fluid 1').

The particles of copper phthalocyanine formed above are collected by filtration and dried. A portion of 6 weight parts of the copper phthalocyanine particles are dispersed in 47 parts by weight of N,N-dimethylformamide by means of Sand Mill UAM-015 (Kotobuki Giken K.K.) to obtain dispersion liquid (fluid 2'). The tri-block copolymer solution (fluid 1') is introduced to first flow channel 2 at a flow rate of 2.5 μL/min, a copper phthalocyanine dispersion in N,N-dimethylformamide (fluid 2') immediately after dispersion by the sand mill is introduced to second flow channel 3 at a flow rate of 2.5 μL/min. The two introduced fluids flowing in laminar flows are partly brought into contact to be mixed uniformly. To this mixture of fluid 1' and fluid 2', 150 weight parts of an aqueous 0.01-mol/L potassium hydroxide solution (fluid 3) is introduced through third flow channel 4 at a flow rate of 5 μL/min. The two fluids flowing in laminar flows are partly brought into contact to be mixed uniformly. The particles of the resulting dispersion are uniform, having an average particle size of 80 nm with narrow particle size distribution. This dispersion containing the pigment as the coloring material is used as an inkjet ink. This dispersion is loaded in an ink tank of a BJ printer S530 (Canon K.K.) and printing is conducted on a plain paper sheet. The printed letters are fine and have improved light resistance.

Example 3

Figure 3:
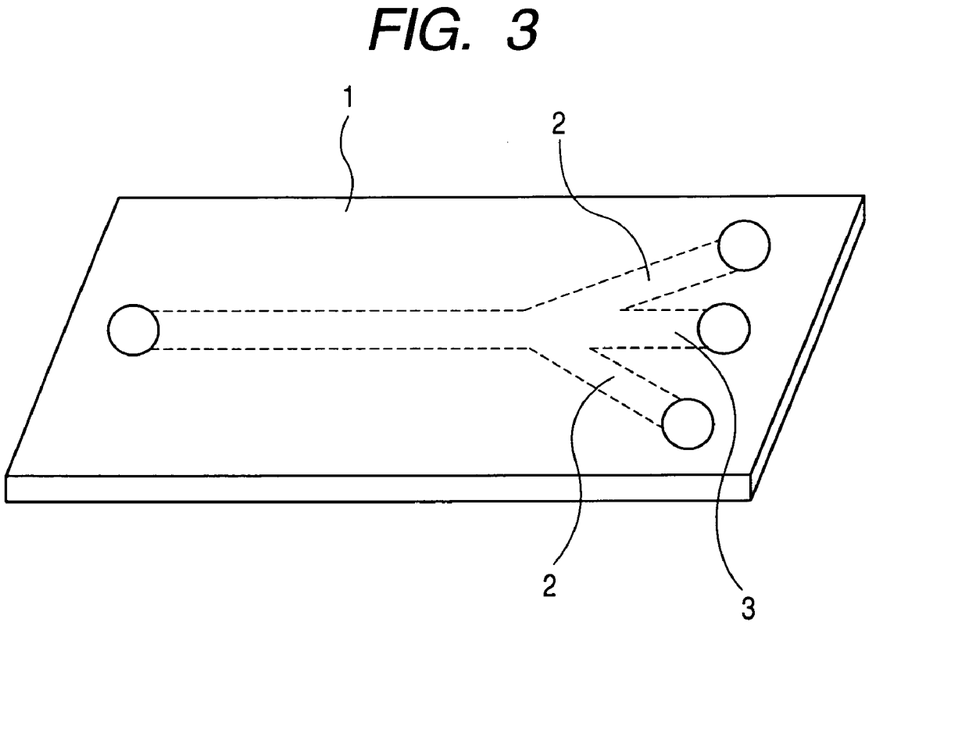
FIG. 3 is a perspective view of still another microreactor applicable in the present invention.
Figure 4:
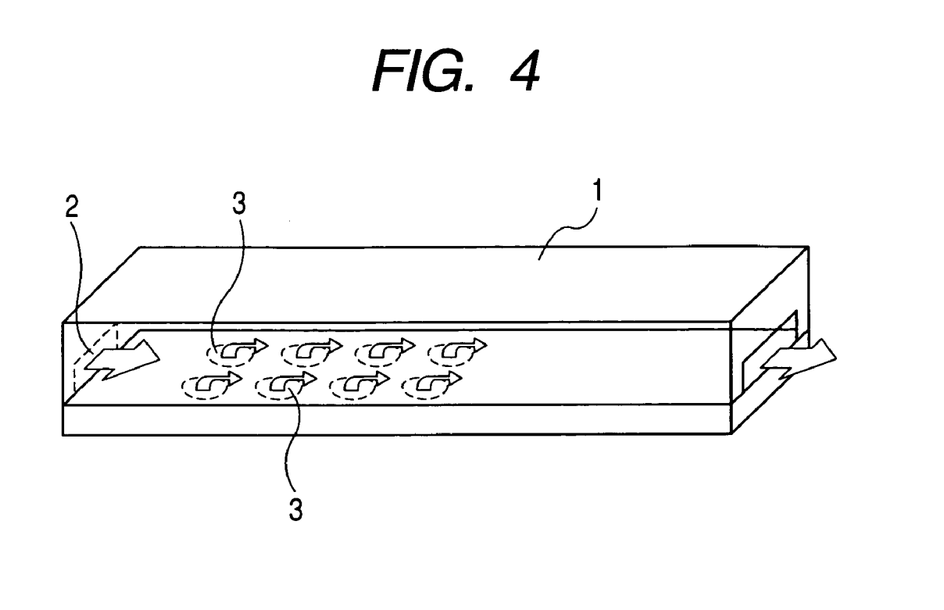
FIG. 4 is a perspective view of still another microreactor applicable in the present invention.
Figure 5:
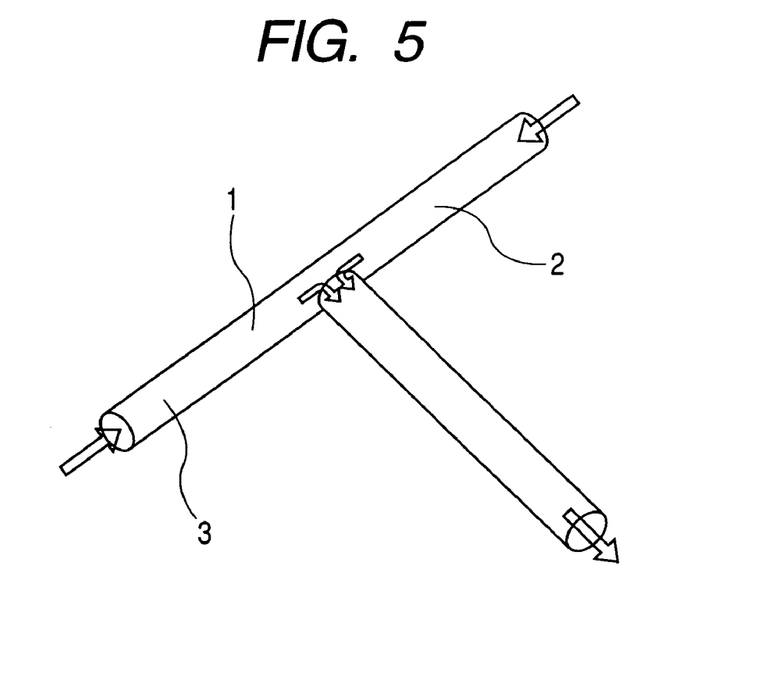
FIG. 5 is a perspective view of still another microreactor applicable in the present invention.

This Example employs microreactor 1 shown in FIG. 1 employed in Example 1, and microreactor 1 shown in FIG. 3. The microreactor shown in FIG. 3 has a flow-mixing channel for mixing fluid 1 introduced through first flow channel 2 and fluid 2 introduced through second flow channel 3, having a width of 30 μm and a depth of 15 μm.

In the first step, a microreactor shown in FIG. 1 is employed. An aqueous 3,3'-dichlorobenziden tetraazo solution (fluid 1) is introduced through first flow channel 2 at a flow rate of 3 μL/min, and an aqueous ca 5% coupling solution (fluid 2) is introduced through second flow channel 3 at a flow rate of 3 μL/min to synthesize particulate Pigment Yellow 12 having small particles uniform in size similarly as in Example 1.

In the next step, microreactor 1 shown in FIG. 2 is employed in the same manner as in Example 1 to mix the obtained Pigment Yellow 12 and the same tri-block copolymer used in Example 1. A portion of 7 weight parts of Pigment Yellow 12 is dissolved in 25 weight parts of tetrahydrofuran (fluid 1). A portion of 10 weight parts of the tri-block copolymer is dissolved in 25 weight parts of tetrahydrofuran (fluid 2). Fluid 1 is introduced through first flow channel 2 at a flow rate of 2.5 μL/min, and fluid 2 is introduced through second flow channel 3 at a flow rate of 2.5 μL/min. The two fluids flowing in laminar flows are partly brought into contact to be mixed uniformly. To the liquid mixture of fluid 1 and fluid 2, 700 weight parts of an aqueous 0.01 mol/L potassium hydroxide solution (fluid 3) is introduced through third flow channel 4. Thereby the same effect is achieved as in Example 1.

Example 4

This Example employs microreactor 1 for two-liquid mixing shown in FIG. 1, and microreactor 1 shown in FIG. 2 used in Example 1.

Quinacridone, a pigment, is used as the coloring material in this Example.

To 8 weight parts of crude quinacridone pigment, is added 8 weight parts of dimethyl sulfoxide to form a dispersion liquid, and thereto a 28% potassium hydroxide-methanol solution is added to dissolve the quinacridone (fluid 1). The block copolymer in this Example is formed from 2-(4-methylphenyl)ethyl vinyl ether units for segment A, 2-(2-methoxyethyloxy)ethyl vinyl ether units for segment B, and ethyl 4-(2-vinyloxy)ethoxybenzoate units for segment C at a copolymerization molar ratio of A/B/C=90/80/14 with the ethyl benzoate groups of the segment C deprotected by sodium hydroxide. To 16 weight parts of this block copolymer, is added 8 weight parts of dimethyl sulfoxide to prepare a solution (fluid 2). A microreactor for mixing three liquids shown in FIG. 2 is employed. Fluid 1 is introduced through first flow channel 2, and fluid 2 is introduced through second flow channel 3. The two fluids flowing in laminar flows are partly brought into contact to be mixed uniformly. To the mixture of fluid 1' and fluid 2', 16 weight parts of water (fluid 3) is introduced through third flow channel 4. The two fluids flowing in laminar flows form quinacridone particles. The reaction proceeds instantaneously to form many nuclei, and many particles grow therefrom, whereby fine particles formed are constituted of small primary particles. Since the flows are laminar, the two fluids are brought into contact at a constant timing to cause particle-deposition reaction regularly. The formed particles are immediately dispersed by the block copolymer. Since these flows are also laminar, the two fluids are brought into contact at a constant timing to cause particle formation reaction regularly. Alkaline fluid 1 and fluid 2 containing the dissolved block copolymer are mixed instantaneously. The mixture is subsequently allowed to react with water. Therefore, salting-out does not occur at the time of mixing of alkaline fluid 1 and fluid 2 containing dissolved block copolymer. The formed particles have an average particle size of 50 nm with a narrow size distribution. The particles in the dispersion have an average particle size of 80 nm with a uniform size distribution.

Example 5

Quinacridone, a pigment, is used as the coloring material in this Example.

To 8 weight parts of crude quinacridone pigment, is added 8 weight parts of dimethyl sulfoxide to form a dispersion, and thereto a 28% potassium hydroxide-methanol solution is added to dissolve the quinacridone (fluid 1). In this Example, the block copolymer is formed from 2-(4-methylphenyl)ethyl vinyl ether units for segment A, 2-(2-methoxyethyloxy)ethyl vinyl ether units for segment B, and ethyl 4-(2-vinyloxy) ethoxybenzoate units for segment C at a copolymerization molar ratio of A/B/C=90/80/14 with the ethyl benzoate groups of segment C deprotected by sodium hydroxide. To 16 weight parts of this block copolymer, is added 8 weight parts of dimethyl sulfoxide to prepare a solution (fluid 2). A microreactor for mixing two liquids shown in FIG. 1 is employed. Fluid 1 is introduced through first flow channel 2, and fluid 2 is introduced through second flow channel 3. The two fluids flowing in laminar flows are partly brought into contact to be mixed uniformly. The mixture is allowed to flow out from an outlet (not shown in the drawing). The liquid mixture flowing out from the outlet is added into an ultrasonic stirrer containing 16 weight parts of water. In the mixing of alkaline fluid 1 with fluid 2 containing block copolymer, salting-out does not occur since the two fluids are mixed instantaneously and the mixture is allowed to react subsequently with water. The formed particles have an average particle size of 55 nm with narrow size distribution. The particles in the dispersion are uniform in size, having an average particle size of 80 nm.

Example 6

Figure 7:
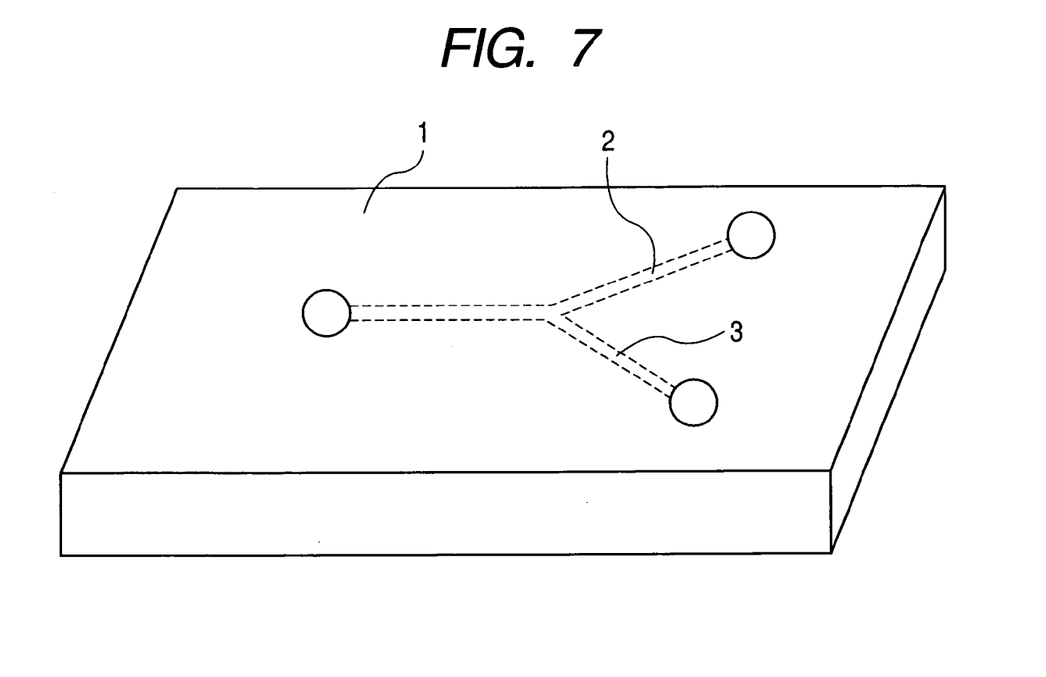
FIG. 7 is a perspective view of still another microreactor applicable in the present invention.

This Example employs microreactor 1 shown in FIG. 7 for mixing two liquids.

In this Example, copper phthalocyanine, a pigment, is used as the coloring material as in Example 2.

Figure 8:
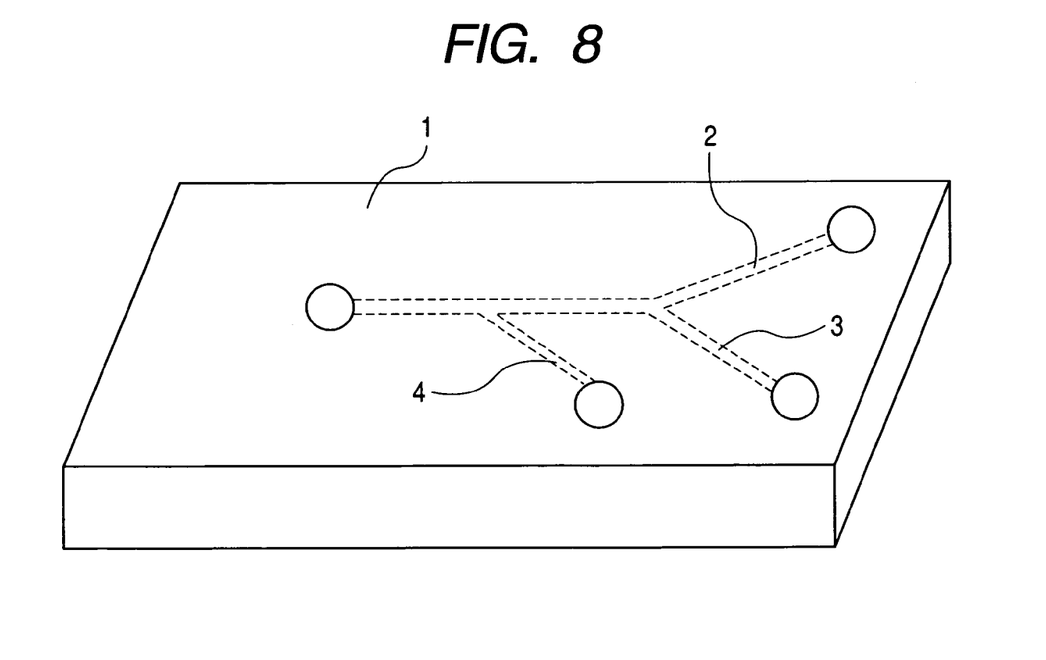
FIG. 8 is a perspective view of still another microreactor applicable in the present invention.

To a portion of 8 weight parts of crude copper phthalocyanine, is added 120 weight parts of concentrated sulfuric acid for dissolution to prepare a paste liquid (fluid 1). In microreactor 1 for mixing two liquids shown in FIG. 7, the flow channel for mixing fluid 1 introduced through first flow channel 2 and fluid 2 introduced through second flow channel 3 has a width of 20 μm and a depth of 90 μm. The cross-sectional area of this part of the flow channel is four times that of the microreactor employed in Example 2. Therefore, in this Example, four times the amounts of fluids in Example 2 are introduced. Fluid 1 is introduced through first flow channel 2 at a flow rate of 10 μL/min, and 400 weight parts of water (fluid 2) which is a poor solvent for copper phthalocyanine is introduced through second flow channel 3 at a flow rate of 10 μL/min. The two fluids flowing in laminar flows are partly brought into contact to form particles of copper phthalocyanine. The reaction proceeds instantaneously to form many nuclei and many particles grow therefrom, whereby fine particles are formed having small primary particle sizes. Since the flow channel width is less than that of Example 2, the distances for diffusion (in a direction perpendicular to the flow direction) necessary for fluid 1 and fluid 2 are less than that of Example 2, making the time shorter than that in Example 2. Further the two fluids in laminar flows are brought into contact at a constant timing, so that the particle-deposition reaction occurs regularly to form the particles having an average particle size of 40 nm with a narrow particle size distribution, In the next step, a microreactor for mixing three liquids shown in FIG. 8 is employed. This microreactor mixes fluid 1 introduced through first flow channel 2 and fluid 2 introduced through second flow channel 3, and further mixes the resulting mixture with fluid 3 introduced through third flow channel 4. Microreactor 1 of FIG. 8 for contacting and mixing fluid 1 introduced through first flow channel 2 with fluid 2 introduced through second flow channel 3 has a flow channel for mixing fluid 1 and fluid 2 having a flow channel width of 20 μm and a depth of 90 μm. The sectional area of the flow channel is four times that of the flow channel of the microreactor in Example 2. Therefore, in this Example, four times the amounts of fluids in Example 2 are introduced.

In microreactor 1, the flow channel for contacting and mixing fluid 3 introduced through third flow channel 4 with the mixture of fluid 1 introduced through first flow channel 2 and fluid 2 introduced through second flow channel 3 has a width of 20 μm and a depth of 90 μm. The cross-sectional area is four times that of the microreactor used in Example 2. Therefore, in this Example, four times the amount of the fluids in Example 2 are introduced in this Example.

In this Example, the block copolymer used is formed from 2-(4-methylphenyl)ethyl vinyl ether units for segment A, 2-(2-methoxyethyloxy)ethyl vinyl ether units for segment B, and ethyl 4-(2-vinyloxy)ethoxybenzoate units for segment C at a copolymerization molar ratio of A/B/C=90/80/14, with the ethyl benzoate groups of segment C deprotected by sodium hydroxide.

A portion of 6 weight parts of this tri-block copolymer is dissolved in 47 weight parts of N,N-dimethylformamide to obtain a block copolymer solution (fluid 1').

The particles of copper phthalocyanine formed above are collected by filtration and dried. A portion of 6 weight parts of the copper phthalocyanine particles are dispersed in 47 parts by weight of N,N-dimethylformamide by means of Sand Mill UAM-015 (Kotobuki Giken K.K.) to obtain dispersion liquid (fluid 2') The tri-block copolymer solution (fluid 1') is introduced to first flow channel 2 at a flow rate of 10 μL/min, a copper phthalocyanine dispersion in N,N-dimethylformamide (fluid 2') immediately after dispersion by the sand mill is introduced to second flow channel 3 at a flow rate of 10 μL/min. The two introduced fluids flowing in laminar flows are partly brought into contact to be mixed uniformly. To this mixture of fluid 1' and fluid 2', 150 weight parts of an aqueous 0.01-mol/L potassium hydroxide solution (fluid 3) is introduced through third flow channel 4. The two fluids flowing in laminar flows are partly brought into contact to be mixed uniformly. Since the flow channel width is less than that of Example 2, the diffusion distances (in a direction perpendicular to the flow direction) necessary for fluid 1 and fluid 2 are less than that of Example 2, and the time of mixing is less than that in Example 2. Further, the block copolymer less diffusive will be mixed rapidly owing to the short diffusion distance. Therefore, the particles in the dispersion are uniform in size, having an average particle size of 60 nm. This dispersion containing the pigment as the coloring material is used as an inkjet ink. This dispersion is loaded in an ink tank of a BJ printer S530 (Canon K.K.) and printing is conducted on a plain paper sheet. The printed letters are fine and have improved light resistance.

Example 7

This Example employs quinacridone, a pigment, as the coloring material.

Figure 9:
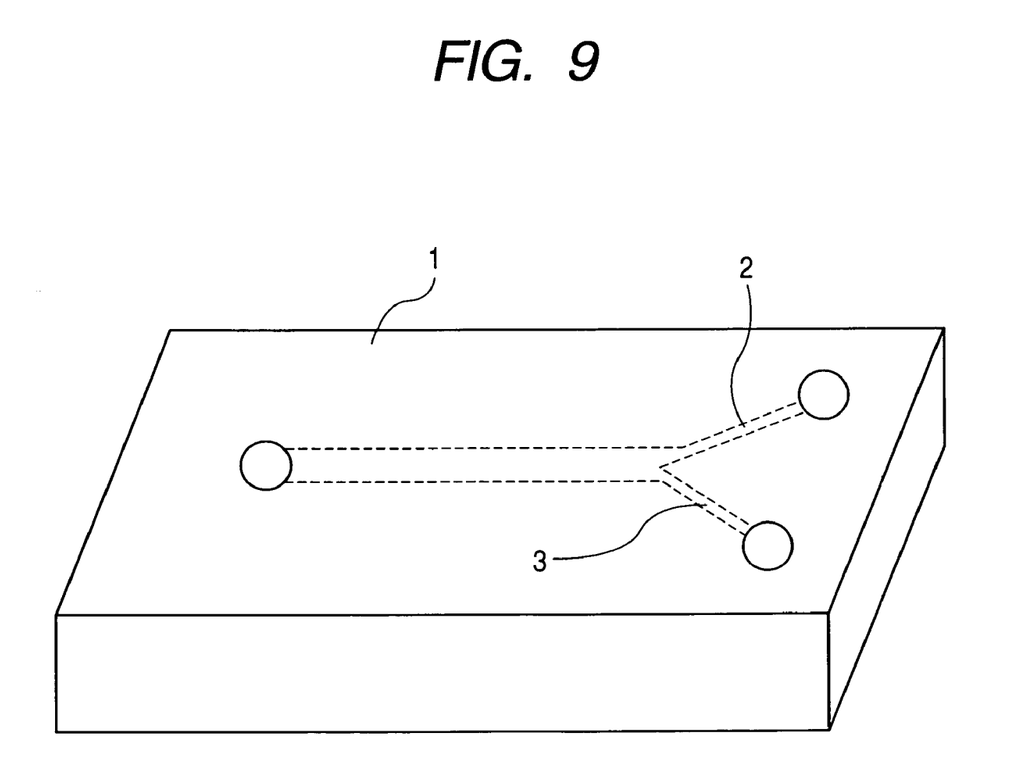
FIG. 9 is a perspective view of still another microreactor applicable in the present invention.

A dispersion of 8 weight parts of quinacridone in 24 weight parts of dimethyl sulfoxide is stirred in a flask equipped with an ultrasonic stirrer. Thereto, a 28% potassium hydroxide-methanol solution is added to solve the quinacridone. In this Example, the block copolymer used is formed from 2-(4-methylphenyl)ethyl vinyl ether units for segment A, 2-(2-methoxyethyloxy)ethyl vinyl ether units for segment B, and ethyl 4-(2-vinyloxy)ethoxybenzoate units for segment C at a copolymerization molar ratio of A/B/C=90/80/14, with the ethyl benzoate groups of segment C deprotected by sodium hydroxide. This block copolymer is dissolved in the above solution in the flask (fluid 1). Water is used as fluid 2. Microreactor 1 for two-liquid mixing shown in FIG. 9 is employed. Fluid 1 is introduced through first flow channel 2 at a flow rate of 500 μL/min, and fluid 2 is introduced through second flow channel 3 at a flow rate of 500 μL/min. The first flow channel of the two-liquid-mixing microreactor shown in FIG. 9 had a flow channel width of 180 μm, and a depth of 180 μm. the second flow channel has a width of 180 μm, and a depth of 180 μm. The portion of the flow channel where fluid 1 from first flow channel 2 and fluid 2 from flow channel 3 are mixed has a flow channel width of 990 μm and a depth of 990 μm. The fluids are mixed in this case under a turbulent flow condition. The particles formed have an average particle size of 55 nm with narrow particle size distribution, and the particle of the dispersion have an average particle size of 60 nm with a uniform particle size.

This application claims priority from Japanese Patent Application No. 2004-264498 filed Sep. 10, 2004, which is hereby incorporated by reference herein.

What is claimed is:

1. A process for producing a composition having a coloring material dispersed with a block copolymer in a solvent, the process comprising the steps of;
   preparing a first fluid containing the coloring material and a second fluid containing the block copolymer;
   introducing the first fluid from a first flow channel connected to a mixing channel of a microreactor;
   introducing the second fluid from a second flow channel connected to the mixing channel; and
   contacting the first fluid with the second fluid in the mixing channel to produce the composition having the coloring material dispersed with the block copolymer in the solvent.

2. The process for producing a composition according to claim 1, wherein precipitation or crystallization of the coloring material is conducted in the mixing channel.

3. The process for producing a composition according to claim 1, wherein the mixing channel has a width ranging from 30 μm to 1000 μm.

4. The process for producing a composition according to claim 1, wherein the contacting of the fluids with each other is with the fluids in a laminar flow state.

5. The process for producing a composition according to claim 1, wherein the contacting of the fluids with each other is caused in a turbulent flow state.

6. The process for producing a composition according to claim 5, wherein the mixing channel has a cross-sectional area of not less than 0.5 mm$^2$, and the ratio of the total cross-sectional areas of flow channels connected with the mixing channel to the cross-sectional area of the mixing channel ranges from 0.01 to 0.1.

7. The process for producing a composition according to claim 1, wherein the mixing channel has a rectangular cross-section having a ratio of a flow channel depth to a flow channel width of not less than 0.5.

8. The process for producing a composition according to claim 1, wherein the block copolymer is amphiphilic.

9. The process for producing a composition according to claim 1, wherein the block copolymer comprises ionic repeating units.

10. The process for producing a composition according to claim 1, wherein the block copolymer comprises polyalkenyl ether structure.

11. The process for producing a composition according to claim 1, wherein the contacting step comprises enclosing the coloring material in the block copolymer.

12. The process for producing a composition according to claim 1, wherein the colorant has an average particle size of not more than 100 nm.

13. The process for producing a composition according to claim 1, wherein the contacting is conducted in a liquid containing an aqueous liquid, and the colorant comprised of the coloring material and the block copolymer is dispersed in the aqueous liquid.

14. The process for producing a composition according to claim 1, wherein a dispersion, formed by mixing the coloring material and the block polymer, is mixed with a dispersing medium.

15. The process for producing a composition according to claim 14, wherein the dispersion is mixed with the dispersing medium in the mixing channel.

* * * * *